Sept. 2, 1930.   A. T. FORD ET AL   1,774,704
BOMB SIGHT
Filed June 16, 1925   3 Sheets-Sheet 1

Fig. 1ª.

INVENTORS.
A. T. Ford
A. S. Halsey
S. B. McMurrain
BY
ATTORNEYS.

Sept. 2, 1930.   A. T. FORD ET AL   1,774,704
BOMB SIGHT
Filed June 16, 1925   3 Sheets-Sheet 2

INVENTORS.
A. T. Ford
A. S. Holsey
BY   S. B. McMurrain

Robert A. Lavender
ATTORNEYS.

Sept. 2, 1930.  A. T. FORD ET AL  1,774,704
BOMB SIGHT
Filed June 16, 1925   3 Sheets-Sheet 3

INVENTORS.
A. T. Ford
A. S. Halsey
S. B. McMurrain
BY
ATTORNEYS.

Patented Sept. 2, 1930

1,774,704

UNITED STATES PATENT OFFICE

ALBERT TAYLOR FORD, ARTHUR SHERMAN HALSEY, AND SAMUEL BARTOW McMURRAIN, OF WASHINGTON, DISTRICT OF COLUMBIA

BOMB SIGHT

Application filed June 16, 1925. Serial No. 37,572.

This invention relates to improvements in bomb sights and more particularly to that type of sight adapted to be carried by aircraft whereby the bombs may be accurately dropped upon the target.

In order that a clearer perception of the present invention and the objects sought may be had, it may be stated that the present device contemplates a simple and practical mechanism whereby the bomber or observer may easily and quickly determine the correct course of the aircraft, the correct dropping angle or instant of release of the bomb and may direct the pilot by using this sight in combination with a pilot directing instrument similar to those now in general use.

Bomb sights are usually specified according to the method employed in determining the ground speed, that is, timing or course setting. The present invention is a combination of both principles heretofore used. In addition to the sight proper of the observer's instrument there is also a pilot's instrument for directing course. The observer's instrument is mounted on the bow of the aircraft or in such position that an unobstructed forward and downward view of the target is possible at all times. The pilot's instrument is mounted upon the instrument board.

The sight hereinafter described is so designed as to first, determine the direction of flight of the aircraft over the ground, second, to direct the pilot towards the target in such a way that the trajectory of the released bomb will intercept the target, third, to determine the correct dropping angle or instant at which the bomb should be released, which feature depends largely upon the determination of the correct ground speed, and fourth, to compensate both for trail behind the vertical in the plane of the aircraft's axis and the lateral trail due to cross wind.

Besides the above purposes the present invention is of simple and practical construction, reliable and efficient in operation and use.

Other objects will be in part obvious and in part hereinafter pointed out in connection with the following analysis of this invention and taken in connection with the accompanying sheets of drawings illustrating one of various possible embodiments of the invention and in the several views of which corresponding parts are indicated by similar reference characters.

In these drawings,

Figure 1 is a side elevation of the sight.

Figure 1ª is longitudinal cross section of the trail cylinder.

Figure 1:
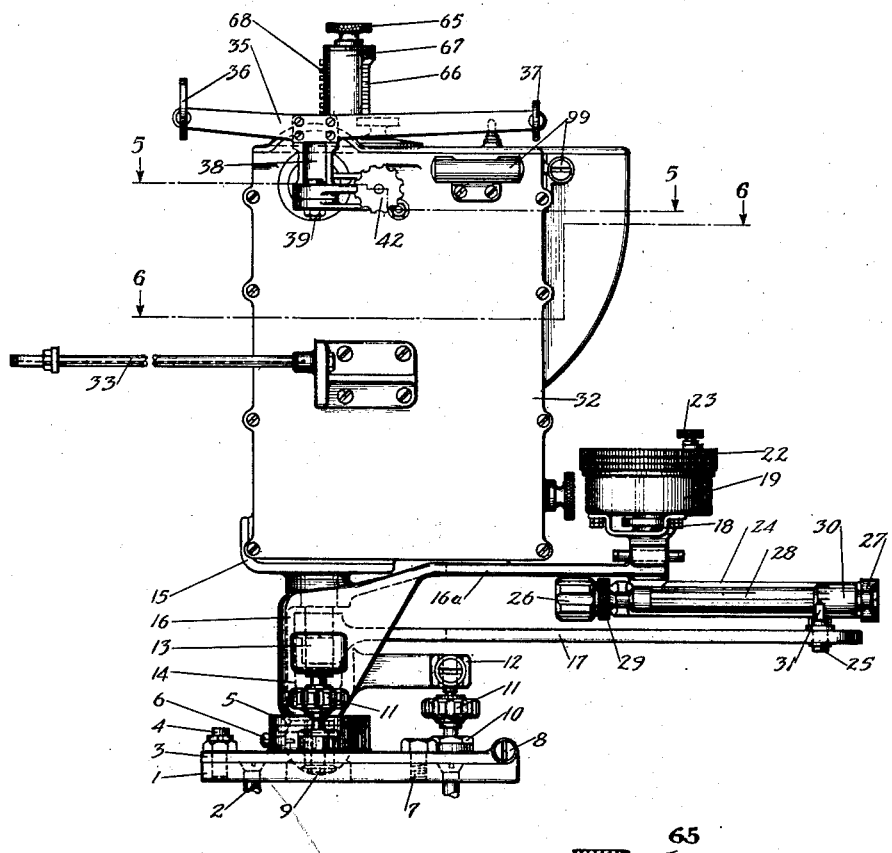
Figure 1:
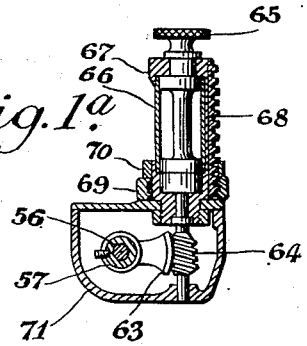
Figure 2:
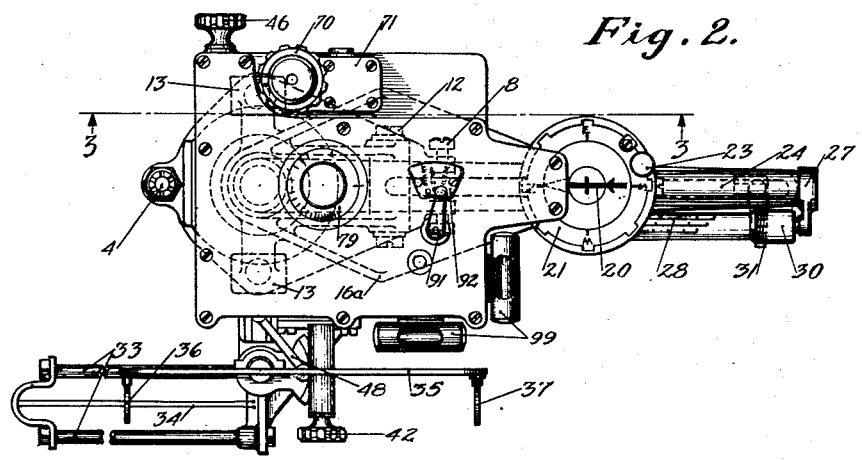
Figure 2 is a plan view.
Figure 3:
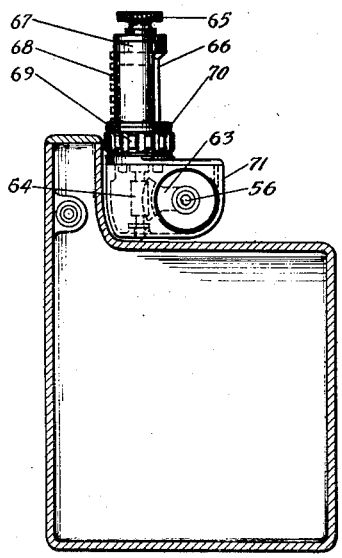
Figure 3 is a partial vertical section taken along the plane of the line 3—3 in Figure 2 and looking in the direction of the arrows.

Referring to Figure 1 and Figure 2, the main base 1 is securely anchored to the airplane by means of counter-sunk head screw bolts 2. Blocking pieces must be provided between this base and the portion of the airplane to which it is secured in order that the vertical center line of the instrument will be normal to the horizontal axes of the airplane.

The leveling base 3 rests on the main base, pivoted to it by pin 4. It can be adjusted in a lateral direction by screws 8 in order to make the fore and aft center line of the sight parallel to the fore and aft line of the airplane. When adjusted it is secured by screws 7 which pass through an arcuate opening in 3.

The bearing housing 16 is supported on the base by a ball and socket joint 5. The end of set screw 6, the conter line of which passes through the center of rotation of the ball, fits into a vertical slot in the ball and prevents rotation of 16 about its vertical axis, thus keeping the compass support 16ª, which is an extension of 16, always fore and aft. Three extensions of 16, one 13 on each side and one 12 extending aft are fitted with pivot bearing and carry leveling screws 11 at their respective ends. The upper part of the leveling screws 11 are threaded to take these pivot bearings or universal joints while the lower ends are secured to the base by ball joints. This permits of leveling the sight by means of the two bubble levels 99 mounted on the main sight housing.

Sight bracket 15 revolves in the bearing housing 16. The wind bar support 17 is secured to the shaft of 15 and revolves with it.

The compass 19 is a standard aircraft magnetic compass except for the differences to be described. A wind arrow 20, Figure 2, is engraved diametrically on the compass crystal which moves with the compass as a whole and points in a direction opposite to the direction in which the wind velocity calibrations are engraved on the wind velocity cylinder 28. Mounted on top of the compass casing is an orienting ring 21, Figure 2, graduated in degrees and retained in place by a ring 22 which is secured to the compass case as shown in Figure 1. The orienting ring is movable angularly and may be clamped in place by clamping nut 23. The compass shaft 18 passes through the compass support 16ª and is secured to the wind bar 24 so that wind bar and compass turn together and wind bar and wind arrow are always parallel.

Inside the wind bar on wind screw housing 24 is a helical screw which is turned by knob 26. The other end of the wind screw bears in cap 27 which also forms a bearing for one end of the wind velocity cylinder. Mounted on the wind screw and traveling along it is wind screw nut 25, the other end of which travels in a slot in the wind bar support 17. A pointer 31 extends from the wind screw nut so as to read the graduation on the wind velocity cylinder. Therefore, as the compass is moved the wind bar is rotated. This rotates 17 which in turn rotates the main sight housing, provided the pointer 31 is set in any except the zero position in which case the wind screw nut is directly under the compass shaft and no movement of 17 results if the compass is rotated.

Alongside the wind screw housing 24 is the wind velocity cylinder 28. This cylinder is free to turn in its bearings, being turned by knob 29. At one end the cylinder is graduated circumferentially in units of air speed, the calibrations being based on actual air speed at a mean altitude of 5000 feet. Longitudinally are wind velocity scales graduated in units proportional to the air speeds to which they correspond. This is done to compensate for variations in the readings of the air speed meter due to differences in air density. Mounted on this cylinder and free to either rotate or slide longitudinally thereon is the lateral trail cylinder 30. This is graduated in units proportional to the altitude and wind velocity for any one terminal velocity bomb to compensate for lateral trail in cross wind bombing.

The main sight housing is rigidly supported on sight bracket 15. Rigidly secured to the left side of the housing and extending forward are sight bars 33 which support two sight wires 34. Above the sight bars is the director bar 35 fitted at each end with ring sights 36 and 37. The director bar is rigidly attached to director bar support 38 which is pivoted about pin 39. The rear end of support 38 is a sector of a worm wheel which is actuated by worm and knob 41 and 42. By this arrangement the director bar can be given a sixty degree movement in azimuth. Pin 39 is keyed to director bar shaft 40 so that the director bar is elevated or depressed as shaft 40 is rotated.

Shaft 40 is supported by the main sight housing and can rotate through an angle of 90 degrees, this rotation being accomplished by two spur gears. One, the driven gear 43, is keyed to shaft 40 and the other the driving gear 44 is keyed to one end of shaft 45, the other end of the shaft projecting through the right side of the sight housing and being fitted with knob 46.

The director bar support 38 is provided with a bore which receives the link pin 47 on which is secured, but free to rotate in a horizontal plane, one end of link 48. The other end of this link is pinned to the sliding block 49 which slides in the hollow director bar shaft 40. The rear end of block 49 is provided with a central tap, its center being coincident with the center line of shaft 40. One end of contact shaft 50 is threaded to fit this tap, the other end having mounted upon it brush support 51, the shaft being free to turn in the support. The brushes 52 ride over the commutator 53 which is composed of nine contacts set in the insulating block 54 which is secured to the forward side of the sight housing. The contacts are connected to electrical conductors leading to lamps in the pilot's instrument. The arrangement is such that when the director bar is parallel to the sight wires 34 the brushes will lie on the center contact, the brushes being of such width relative to the size and spacing of the contacts that any movement of the director bar from the center position brings the brushes into engagement with the adjoining contact on that side.

Figure 7:
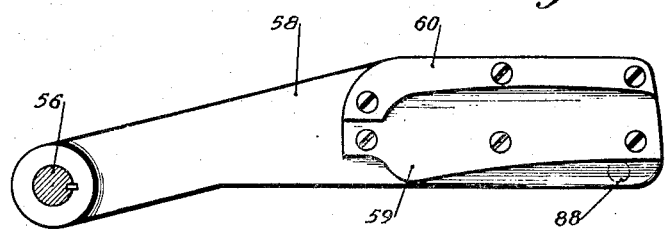
Figure 7 is a side view of the cam arm 58 of Figures 5 and 6 showing in detail the arrangement of the cam plates fastened thereon.

Meshing with gear 43 is spur gear sector 55 which is keyed to cam shaft 56, one end of which is supported by the sight housing and the other by sleeve 57. Keyed to the cam shaft is cam arm 58 which carries two cam plates 59 and 60 (see Figure 7) which make contact with stop pin 88 on crosshead 74. Therefore, turning director bar 35 through any vertical angle will turn cam arm 58 through the same vertical angle.

Keyed to the inner end of sleeve 57, which revolves in ball bearings 61 is ground speed arm 62 which makes contact with ground speed cam 75. Keyed to the opposite end of the sleeve is a sector of a worm wheel 63 actuated by worm 64 which in turn is actuated by a knob 65 fixed to the trail cylinder 66 (see Fig. 1ᵃ). Worm and sector are enclosed by trail gear housing 71 which is keyed to the end of cam shaft 56. This housing also forms the supports for worm 64 and cylinder 66. The trail cylinder 66 is calibrated in units proportional to the altitude and air speed for one terminal velocity of bomb. The altitude scale is parallel to the cylinder's axis and circumferentially are different air speed scales for each division on the altitude scale.

Partially surrounding the trail cylinder is the cylinder casing 68 and mounted on the casing and moving up and down it by means of a helical thread is altitude knob 69. Resting on the altitude knob is the wind plate 70 which is keyed to the cylinder casing so that it will rise with the altitude knob but will not turn with it. The upper face of the wind plate is graduated circumferentially in wind velocity, scales running both way from zero, one scale being for bombing with the wind, the other for bombing against the wind.

Theoretically when the trail is set at zero, the ground speed arm and the cam arm should be parallel. Actually under this condition the cam arm is four degrees above the ground speed arm, this offset being to insure that the cam arm will never strike the ground speed cam, and being compensated for by the shape of the cam plates. When the trail is adjusted the ground speed arm 62 is offset from its zero position so that the angle formed by it and the cam arm 58 will subtend a distance on the ground equal to the trail.

The adjustment for trail behind the vertical is made in the following manner: Wind plate 70 is raised to altitude reading on trail cylinder 66 by rotating altitude knob 69, and then the trail cylinder 66 is rotated until the correct air speed calibration on same coincides with the correct wind calibration on the wind plate 70. In event there is no wind the air speed calibration on trail cylinder 66 coincides with the zero marking on the wind plate.

The trail cylinder is rotated by means of knob 65 which also actuates the trail worm 64 which in turn actuates the trail worm wheel section 63, thereby offsetting ground speed arm 62 in an angular position from the cam arm 58.

By revolving director bar 35 through any angle in a vertical plane, the entire trail mechanism, together with casing 71 and ground speed arm 62, and cam arm 58 will rotate through the same angle.

Bolted to the inside front and rear of main sight housing are crosshead guides 72 and 73 guiding crosshead 74 which moves in a vertical direction. Mounted on the crosshead is ground speed cam 75 which revolves in a horizontal plane and is so cut that distances from its center of rotation to the perimeter are proportional to distances covered over the ground during the times of fall of the bomb in a vacuum from various altitudes and at various speeds of the airplane. Therefore, the ground speed arm, if not offset for trail, will, when in contact with ground speed cam, form the correct range angle for vacuum fall of bomb, and will, when offset for trail form correct range angle for the bomb in air, provided in both cases the ground speed cam is set for altitude.

Ground speed cam and crosshead are provided with bores through which passes motor shaft 76, the ground speed cam being free to slide vertically on the shaft but keyed so as to rotate with shaft. The lower end of the shaft is supported and driven by an electric motor 77 at a constant speed. The shaft revolves freely in the crosshead 74, drives cam 75 and the upper end is supported by ball bearings. The upper end of the shaft passes through the top plate of the sight housing and terminates in dial and knob 79. The dial is graduated in units of ground speed and the knob is for the purpose of returning the cam to its zero position. The motor is controlled by electric contact start and stop buttons 80 (Fig. 4) on the right side of the sight housing. The crosshead is raised and lowered to set it for altitude by knob 82, bevel gears 81 and 83 and screw shaft 84 which passes through a threaded lug on the crosshead. Mounted on the crosshead is index pointer 85 by which the crosshead may be set for altitude on altitude scale 86 (Fig. 6) which is read through a glass covered slot in the rear slot in the rear face of the sight housing.

Also mounted on the crosshead is the stop pin housing which is provided with a central bore to house stop pin 88. The stop pin is moved in a horizontal direction by crank arm 89 which is keyed to stop pin shaft 90 so as to rotate with it but is free to slide vertically on it. Shaft 90 passes through the top plate of the sight housing, terminating in a crank lever 91 which may be set in three positions on indicator plate 92, Figure 2, "Start", "Stop" and "Clear". By setting crank lever 91 in these different positions the stop pin is moved so as to make contact with cam plate 59 for start time, with cam plate 60 for stop time, or will clear both cam plates as cam arm 58 is depressed.

The main sight housing 32 is made up of three units, the main casing, the left side plate and the top plate. The assembled housing should be made as nearly moisture proof as possible.

By means of this bomb sight the target may be approached from any direction relative to the wind, in other words, drifting or not drifting, and the pilot in following the guidance of the observer may dismiss the matter of drift from his mind, employing the same tactics regardless of the direction or velocity of the wind.

The sight mechanically embodies a vector diagram to secure a resultant of air speed and wind. The compass support 16ª being mounted parallel to the center line of the airplane represents the direction of the plane's flight through the air. The distance between the sight bracket pivot 15, Figure 1, and the compass pivot 18 is fixed and remains constant for all air speeds, change in air speed being allowed for by the different wind velocity scales on the wind velocity cylinder. The wind bar 24 and wind velocity cylinder 28 represent in position the direction of the wind and in setting the velocity of the wind. The units on the wind velocity cylinder for any one air speed are proportional to the horizontal distance from the sight bracket pivot to the fulcrum of the wind bar for that setting. A horizontal line drawn from the sight bracket pivot to the stub shaft on the wind screw nut 25 is the resultant which in position represents the direction of movement due to the two components and in length represents the quantum of this movement. In the case of a moving target the observer by means of the director 35 and sight wires 34 directs the pilot on a collision course and the approach is made in the same manner as for stationary targets. Target speed is eliminated from consideration as the target itself is used as the point of reference in determining ground speed, so that in the case of a moving target the ground speed registered is not true ground speed but relative speed between airplane and target.

Considering the direction of flight over the ground it will be seen that when there is no wind or in flying into or with the wind, the sight wires 34 are parallel to the compass support, that is, the longitudinal axis of the airplane. In the case of an intersecting wind when there is drift the sight wires will occupy a position swinging angularly to one side or the other. The swinging of the sight wires is automatically secured by rotating the compass. As the compass is rotated the wind arrow engraved on its crystal and the wind bar rotate with it, the offset effected by the wind bar being directly opposite to the direction of the arrow. The result is that the sight wires are offset in the direction of the arrow.

The sight has been designed to be set for wind with the airplane in flight. This is done by setting the compass so the wind arrow is parallel to the compass support and pointing forward and then flying into the wind, this being determined by sighting along the sight wires upon the ground below and altering the airplane's course until no drift is perceptible. Proper alterations, of course, are facilitated by the pilot directing mechanism. The orienting ring 21 is now moved to such position that the north indicating point on the ring aligns with the north marking on the compass card, and the clamping nut 23 tightened. The direction of the wind has now been determined. Course is then changed 90 degrees to either right or left, that is, to the direction in which maximum drift occurs, the observer swinging the compass to keep north on the ring aligned with north on the card and then adjusting the wind screw nut by turning knob 26 until the sight wires are parallel to the line of actual flight as determined by sighting along them on the ground. The velocity of the wind has now been determined but not recorded. The observer then ascertains the plane's speed from the air speed indicator and sets the wind velocity cylinder accordingly. The pointer 31 on the wind screw nut will now register the wind velocity. The trail cylinder 30 is now turned to the correct altitude and slid along the wind velocity cylinder until its zero point coincides with pointer 31 after which wind screw knob 26 is turned until the pointer has been moved to the correct wind velocity on the trail cylinder, thus compensating for lateral trail. If the wind is known from meteorological observations the sight may be set before taking off, providing the wind velocity cylinder is adjusted for air speed after the plane is in flight. Once determined the angle between north and the wind is maintained, regardless of changes of course by the airplane, by rotating the compass so as to keep "north to north", and thus the offset effected by the wind bar is always in the right direction. With a port beam wind the offset of the wind bar is to port thus offsetting the sight wires to starboard parallel to the movement over the ground.

Figure 4:
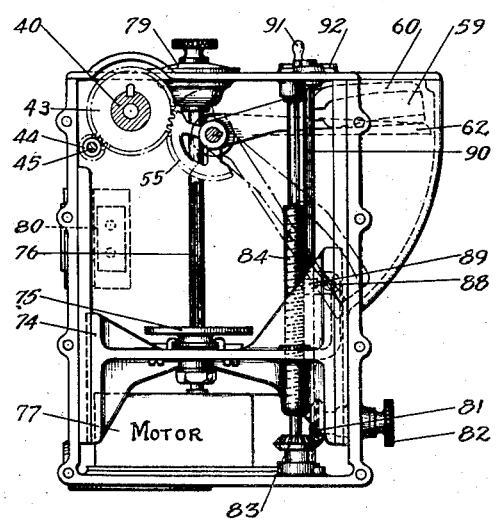
Figure 4 is the main sight housing as in Figure 1 with the left side plate removed.
Figure 5:
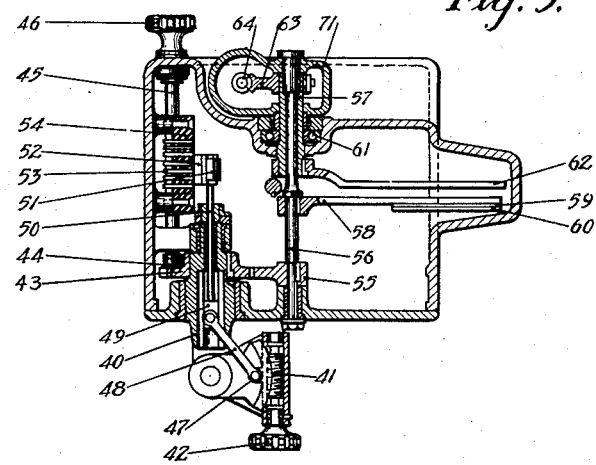
Figure 5 and Figure 6 are partial horizontal sectional views taken on the planes of the lines 5—5 and 6—6 respectively of Figure 1 and looking in the direction of the arrows.
Figure 6:
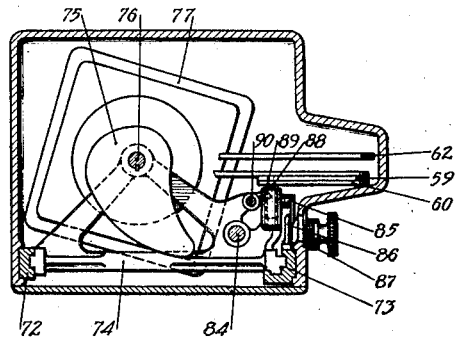

The observer now sets the ground speed cam for altitude by knob 82, Figure 4, and scale 86, Figure 6. The adjustment for trail is then made as follows. Wind plate 70 is raised by turning knob 69 to the correct altitude reading on the trail cylinder 66 and the latter is then turned by knob 65 so that the correct air speed graduation on the cylinder coincides with the correct wind graduation on the wind plate.

In the event of no wind or of bombing directly across wind the zero graduation on the wind plate is used. Otherwise the graduation used is that recorded on the wind velocity cylinder, either "up" or "down" wind as the case may be.

Introduction of the correction for wind velocity in the trail adjustment is due to the fact that in offsetting the ground speed arm 62 from cam arm 58 in order to allow for trail, the angle formed thereby will subtend different distances on the ground depending upon the ground speed of the plane.

Therefore, although the trail is exactly the same regardless of the velocity or direction of the wind, in the case of a head wind the airplane's travel with respect to the ground is reduced and the angle formed by the ground speed arm 62 and cam arm 58 would subtend a lesser distance on the ground than it would in case of no wind or flying with the wind, whereas the distance should be exactly the same regardless of the velocity or direction of the wind.

This correction is a close approximation as it assumes that the full velocity of the wind is effecting the airplane's speed whereas only the component of the wind in the line of flight should be used. However, this correction is so small that the necessary mechanism to properly compensate for it would introduce too many complications into the sight.

On picking up the target the observer adjusts the director bar so that his line of sight intersects the target and thus automatically, by means of the pilot directing mechanism, brings the pilot onto the correct course. With the airplane on a steady course the observer sets crank lever 91, Figure 2, at "Start", depresses the director bar until cam plate 59, Figure 4, meets the stop pin and then as the target comes on his line of sight starts the motor by pressing button 80. The crank lever is then shifted to "Stop", the director bar further depressed until cam plate 60 meets the stop pin and as the target crosses the line of sight a second time the motor is stopped. The crank lever is now set at "Clear", the director bar depressed until the ground speed arm meets the ground speed cam and as the target crosses the line of sight for the third time the bomb is released.

Cam plates 59 and 60 are so shaped that the angle formed by them in conjunction with the stop pin subtends a fixed distance on the ground at any altitude or ground speed and the motor records by means of the ground speed cam the time consumed by the airplane in covering this fixed distance.

Separate trail cylinder and lateral trail cylinders may be provided for use with bombs of different terminal velocities.

We claim:

1. In a bomb sight, a rate of approach determining mechanism including a shaft, a cam sliding vertically upon said shaft, and means for rotating said shaft and cam at a constant speed during the time it takes the airplane to advance a fixed distance over the ground thereby affording a means for measuring distances over the ground.

2. In a bomb sight, a rate of approach determining mechanism comprising a vertical shaft, a cross-head thereon, a cam rotating with said shaft, and means for rotating said cam and shaft at a constant speed freely within said cross-head, said cam and cross-head being free to slide in a vertical direction on said shaft thereby to afford a means for timing distances over the ground at any desired altitude.

3. In a bomb sight, a rate of approach determining mechanism comprising a shaft, a plurality of cam arms rotatable with said shaft, cams on said arms, and a stop pin, said cams being so shaped that the angle through which the shaft and arms are rotated upon successive engagement of said cams with said pin, subtends a fixed distance on the ground for all positions of said pin.

4. In a bomb sight, a rate of approach determining mechanism, a shaft, a cam arm, two cam plates mounted thereon, a stop pin, means for rotating said shaft to carry said cam plates into operative relation to said stop pin, and means whereby said pin may be set to clear said cam thereby permitting of operations by use of one operating stop pin.

5. In a bomb sight, a rate of approach determining mechanism comprisng a shaft, a stop pin adjacent thereto, and cam plates associated and rotatable with said shaft and engageable with said stop pin whereby the rate of approach and dropping angle may be automatically obtained.

6. In a bomb sight, a direction of flight determining mechanism comprising depressible sighting means, a ground speed cam, and an arm connected with said sighting means whereby when the sight is depressed said arm will be engaged with the ground speed cam at the correct range angle for the particular ground speed, which locates said sighting means at the correct range angle.

7. In combination, in a bomb sight, a stationary base, a base movable on said stationary base about a vertical axis, an arm rigidly fixed to the movable base, an arm rigidly fixed to the stationary base, a link connecting the extremities of the arms, said link including a wind cylinder graduated circumferentially and longitudinally, and a second cylinder mounted parallel thereto and adjustable longitudinally thereon to vary the effective length of the connection between the aforesaid arms whereby corrections for lateral trail in cross wind bombing may be obtained for any particular terminal velocity of a bomb.

8. In combination, in a bomb sight, means for determining the rate of approach of an airplane to an objective, the means comprising a rotatable shaft, a cam rotatable with said shaft and free to slide longitudinally thereof for adjustment for altitude, said cam being so cut that the distance from its center of rotation to the perimeter are proportional to the distance of approach covered by the airplane during the time of fall of the bomb, means for rotating the shaft, and means for starting and stopping the rotation means whereby the linear distance of travel of the plane is measured by the angular rotation of the shaft and cam between the time of starting and stopping of the rotation of the shaft.

9. In combination in a bomb sight, means for determining the rate of approach of an airplane to an objective, the means including a sighting means subtending a fixed distance on the ground, a rotatable shaft, a cam sliding upon said shaft, means for rotating said shaft and cam at a constant speed during the time it takes the airplane to advance a fixed distance relative to the objective, and means for measuring the angular rotation of the shaft whereby the rate of approach is determined.

10. In combination in a bomb sight, means for determining the rate of approach of an airplane to an objective, the means comprising a rotatable shaft, a cam rotatable with said shaft, a cross-head thereon, means for rotating said cam and shaft freely within said cross-head at a constant speed, said cam and cross-head being free to slide on said shaft, means for measuring the angular rotation of the shaft whereby the rate of approach is determined, and means for adjusting the cam along the shaft at a distance relative to the altitude of the airplane above the objective.

11. In combination in a bomb sight, means for determining the rate of approach of an airplane to an objective, said means comprising a rotatable shaft, a cam keyed thereto and rotatable therewith and slidable therealong, a second shaft at right angles to the first shaft, a ground speed arm and a cam arm mounted upon the second shaft, cams on said cam arm, a housing enclosing the parts, a director bar mounted outside the housing, gearing connecting said bar and second shaft, a dial mounted upon the outer end of the rotatable shaft outside of the housing, and an index upon the housing in close proximity to the dial whereby the position of the cam and rotatable shaft may be ascertained, said ground speed arm being adapted to have its rotative position determined by contacting said first mentioned cam.

12. In combination in a bomb sight, means for determining the rate of approach of an airplane to an objective including a rotating shaft, a cam rotatable with the shaft and movable therealong, means for moving the cam along the shaft and fixing it in a definite position corresponding to the altitude of the airplane above the objective, and means engaging the cam for compensating for longitudinal trail.

13. In combination in a bomb sight, means for determining the rate of approach of an airplane to an objective including a rotating shaft, a cam rotatable with the shaft and movable therealong, means for moving the cam along the shaft and fixing it in a definite position corresponding to the altitude of the airplane above the objective, means for rotating the shaft at a constant speed during the passage of the airplane over a known distance of travel, means for indicating the angular rotation of the cam, and means engaging the cam for compensating for longitudinal trail.

14. In combination in a bomb sight, means for determining the rate of approach of an airplane to an objective including a rotating shaft, a cam rotatable with the shaft and movable therealong, means for moving the cam along the shaft and fixing it in a definite position corresponding to the altitude of the airplane above the objective, and means engaging the cam, the means consisting of cams, arms for carrying said cams, a shaft at right angles to the rotating shaft and carrying said arms, an optical sight, a longitudinal trail compensating means, and means for respectively connecting the sight and compensating means to the shaft.

15. In a bomb sight, a rate of approach determining mechanism including a housing, a cross-head operable within the housing, control means for operating the crosshead, a stop pin carried by the crosshead, means for regulating the position of the stop pin on the crosshead, a shaft within the housing along which the crosshead moves, a motor within the housing for imparting motion to the shaft, a second shaft at right angles to the first said shaft, a mechanism operable exteriorly of the housing for imparting motion to the second shaft, and a cam plate arm mounted on said second shaft, said arm engaging with the stop pin whereby fixed distances over ground may be measured.

16. In combination in a bomb sight, means for determining the rate of approach of an airplane to an objective, the means comprising a rotatable shaft, a plurality of arms rotatable with said shaft, cam plates carried on one of said arms, a second shaft at right angles to said first shaft, and a stop pin movable along the second shaft and located in the path of rotation of the arm carrying the plates, said cam plates being so shaped that the angle of rotation thereof upon successive engagement of said plates with said pin adjusted for altitude subtends a fixed distance on the ground at all altitudes.

17. In a bomb sight in combination, means for determining the rate of approach of an airplane to an objective comprising a rotatable shaft, a screw shaft parallel thereto, a crosshead mounted upon the screw shaft and adjustable therealong, a cam carried by said crosshead rotating with the rotatable shaft and adjustable therewith, a third shaft at an angle to the rotatable and screw shafts, an arm affixed to the third shaft, cams carried by the arm, a stop pin on the crosshead for selective engagement with said cams for limiting the rotative movement of the third shaft, and a pointer attached to the movable stop pin and operable over a scale to indicate to an observer the relative location of the cam arm and stop pin.

18. In combination in a bomb sight, means for determining the rate of approach of an airplane to an objective including a rotating shaft, a cam rotatable with and movable along the shaft, means for moving the cam along the shaft and fixing it in a definite position corresponding to the altitude of the airplane above the objective, cam carrying arms, a second shaft at an angle to the rotating shaft and carrying said arms whereby rotation of said shaft may move one of the cams into engagement with the first named cam, a sighting bar, and a means for compensating for longitudinal trail connected with the second shaft, said means consisting of a housing rigidly affixed to one of the cam arms, a calibrated cylinder rigidly affixed to the housing, a shaft within the housing, a gear fixed to the end of this shaft enmeshed with a gear upon the second shaft, and means connecting the sight bar to the second shaft.

Signed at Washington, District of Columbia, 1925.

SAMUEL BARTOW McMURRAIN.
ARTHUR SHERMAN HALSEY.
ALBERT TAYLOR FORD.